(12) United States Patent
Podgurski et al.

(10) Patent No.: US 8,360,721 B2
(45) Date of Patent: Jan. 29, 2013

(54) LOW MAINTENANCE STIFF IN PLANE GIMBALED ROTOR HEAD

(75) Inventors: Daniel M. Podgurski, West Chester, PA (US); Thomas A. Zientek, Drexel Hill, PA (US); Evhen M. Mychalowycz, Swarthmore, PA (US)

(73) Assignee: The Boeing Company, Chicago, IL (US)

( * ) Notice: Subject to any disclaimer, the term of this patent is extended or adjusted under 35 U.S.C. 154(b) by 1393 days.

(21) Appl. No.: 11/971,077

(22) Filed: Jan. 8, 2008

(65) Prior Publication Data
US 2009/0175725 A1 Jul. 9, 2009

(51) Int. Cl.
*B64C 27/52* (2006.01)

(52) U.S. Cl. ......... 416/1; 416/134 A; 416/138; 416/140; 416/141; 416/148

(58) Field of Classification Search .............. 416/1, 61, 416/102, 134 A, 138, 140, 141, 148–150, 416/168 R, 244 R, 114
See application file for complete search history.

(56) References Cited

U.S. PATENT DOCUMENTS

| | | | | |
|---|---|---|---|---|
| 2,663,371 A * | 12/1953 | Magill | | 416/168 R |
| 3,080,002 A * | 3/1963 | Du Pont | | 416/102 |
| 3,874,820 A * | 4/1975 | Fenaughty | | 416/134 A |
| 4,323,332 A | 4/1982 | Fradenburgh | | |
| 4,477,225 A * | 10/1984 | Burkam | | 416/134 A |
| 4,714,450 A | 12/1987 | Byrnes et al. | | |
| 4,804,352 A | 2/1989 | Schmidt | | |
| 5,165,853 A * | 11/1992 | Pancotti | | 416/134 A |
| 5,215,502 A | 6/1993 | Neathery et al. | | |
| 7,144,326 B2 | 12/2006 | Thompson | | |

* cited by examiner

*Primary Examiner* — Christopher Verdier
(74) *Attorney, Agent, or Firm* — Haynes and Boone, LLP

(57) ABSTRACT

A stiff in-plane gimbaled rotor head for a rotorcraft, such as a helicopter, includes a vertically extending rotor shaft, a center hub disposed on the rotor shaft for conjoint rotation therewith, and an outer hub surrounding the center hub and coupled thereto through a spherical gimbal bearing for conjoint rotation therewith, and such that the outer hub is also capable of an angular range of gimbaling movement relative to the center hub. A plurality of rotor blades, which may include three or more blades, is coupled to the rotor shaft through the inner and outer hubs by a constant velocity joint that enables the blades to be rotated in a common plane about the axis of the rotor shaft while controlling the respective pitches of the blades and such that any other relative in-plane and out-of-plane movements of the blades during rotation is prevented.

18 Claims, 9 Drawing Sheets

LOW MAINTENANCE STIFF IN PLANE GIMBALED ROTOR HEAD

FEDERALLY SPONSORED RESEARCH OR DEVELOPMENT

This invention was made with Government support under Cooperative Agreement #W911W6-05-2-0006, awarded by the United States Army. The government has certain rights in this invention.

BACKGROUND

This disclosure relates to vertical takeoff and landing (VTOL) rotorcraft, in general, and in particular, to a high speed, low drag, low maintenance, stiff in-plane, gimbaled rotor head for a helicopter that enables three or more rotor blades to be used per rotor, while enabling a more compact tandem rotor helicopter by allowing greater blade intermesh through the elimination of the lead-lag motions and dampers associated with the fully articulated rotor heads of the prior art.

A fully articulated type of rotor head 100 of the prior art, such as used on the Boeing CH-47 "Chinook" tandem rotor helicopter, is illustrated in FIG. 9. As illustrated therein, the fully articulated rotor head comprises a rotor shaft 102, a hub 104 disposed at the end of the shaft and three blades 106 radiating outward from it. Each of the rotor blades is pinioned to the hub by a pair of hinges, viz., a "flap" hinge 108 and a "lag" hinge 110 that respectively enable the associated blade to pivot both up and down, and fore and aft, relative to the hub. Additionally, the blades and lag hinges are rotatably coupled to respective flap hinges by respective pitch shafts 112 rotatably disposed within respective pitch shaft housings 113 for conjoint rotation with the respective blades about the respective long axes thereof. Thus, in addition to being capable of up and down and pitching movements, the blades are also capable of lead-lag movement in the plane of rotation of the blades, i.e., they are "flexible in-plane."

A disadvantage of flexible in-plane rotor head designs when used in tandem rotor aircraft is that it is difficult to get the respective blades of the two rotors to intermesh with each other when rotating in the same plane due to the range of angular displacement that each blade may undergo within its respective plane of rotation. As a result, the two rotors must be spaced apart from each other, either horizontally or vertically, such that the respective blades do not overlap, or their respective planes of rotation are not coplanar.

In order to overcome this drawback, efforts have been made to develop "stiff in-plane" rotor hubs, i.e., hubs with blades that are incapable of pivotal movement in the plane of rotation of the blades. The existing solutions for stiff in-plane hubs are the so-called two-bladed "teeter" hubs, such as used on many light rotorcraft, and three-bladed gimbaled hubs, such as are used on the Bell-Boeing V-22 "Osprey" hybrid tilt-rotorcraft.

Studies have shown that rotors having greater solidity are required for next-generation, high speed, heavy lift, tandem rotor helicopter designs. This greater rotor solidity is most efficiently delivered with a large number of blades (as many as 6 blades per head). Teeter rotor heads inherently can employ only two blades per hub, and are therefore unsuitable for high speed, heavy lift helicopter configurations. The use of stiff in-plane hubs enables a larger number of blades (more than three) of the two rotors to intermesh tightly when rotating in the same plane so as to keep the configuration compact and performance high, while at the same time avoiding the limitations of the flexible in-plane hubs of the prior art.

Accordingly, there is a need in the rotorcraft field for a high speed, low drag, low maintenance, stiff in-plane, gimbaled rotor head for a high-speed, heavy lift helicopter that achieves a more compact tandem rotor blade intermesh by eliminating the lead-lag motions and dampers used in the fully articulated rotor heads of the prior art, and that also enables more than three rotor blades to be used per rotor.

SUMMARY

In accordance with the present disclosure, high speed, low drag, low maintenance, stiff in-plane, gimbaled rotor heads for helicopters are provided that enable three or more rotor blades to be used per rotor, and that also enable a compact tandem rotor blade intermesh to be achieved by eliminating the lead-lag motions and dampers of fully articulated rotor heads.

In one exemplary embodiment, a stiff in-plane, gimbaled rotor head for a rotorcraft comprises an elongated, vertically extending rotor shaft having an axis of rotation. A center hub is disposed at an upper end of and is rotationally driven by the rotor shaft. A split outer hub surrounds and is coupled to the center hub through a spherical main gimbal bearing such that the outer hub is capable of an angular range of gimbaling movement relative to the center hub. An elongated, radially extending blade has an airfoil cross-section and an inboard end rigidly coupled to the outer hub, and a constant velocity joint couples driving torque from the rotor shaft to the blade through the center and outer hubs such that, during rotation of the blade about the axis of rotation of the rotor shaft, the rotational velocity of the blade about the tilted axis of rotation remains substantially constant during gimbaling movements of the outer hub relative to the inner hub.

In another exemplary embodiment, a method for rotating each of a plurality of rotorcraft blades in a common plane and about an axis of rotation while controlling the respective pitches of the blades and substantially preventing any other relative in-plane and out-of-plane movements of the blades during the rotating comprises providing a rotating rotor shaft concentric to the axis of rotation; fixing a central hub to the rotor shaft for conjoint rotation therewith; coupling an outer hub to the center hub for conjoint rotation therewith and such that the outer hub is also capable of an angular range of gimbaling movement relative to the center hub; and, coupling an inboard end of the blades to the outer hub such that each blade is capable of pitching movement relative to the outer hub and is substantially incapable of any other movements relative thereto.

A better understanding of the above and many other features and advantages of the novel rotor heads of the present disclosure can be obtained from a consideration of the detailed description of an exemplary embodiment thereof below, particular if such consideration is made in conjunction with the appended drawings, wherein like reference numbers are used to refer to like elements in the respective figures thereof.

DETAILED DESCRIPTION

Figure 9:
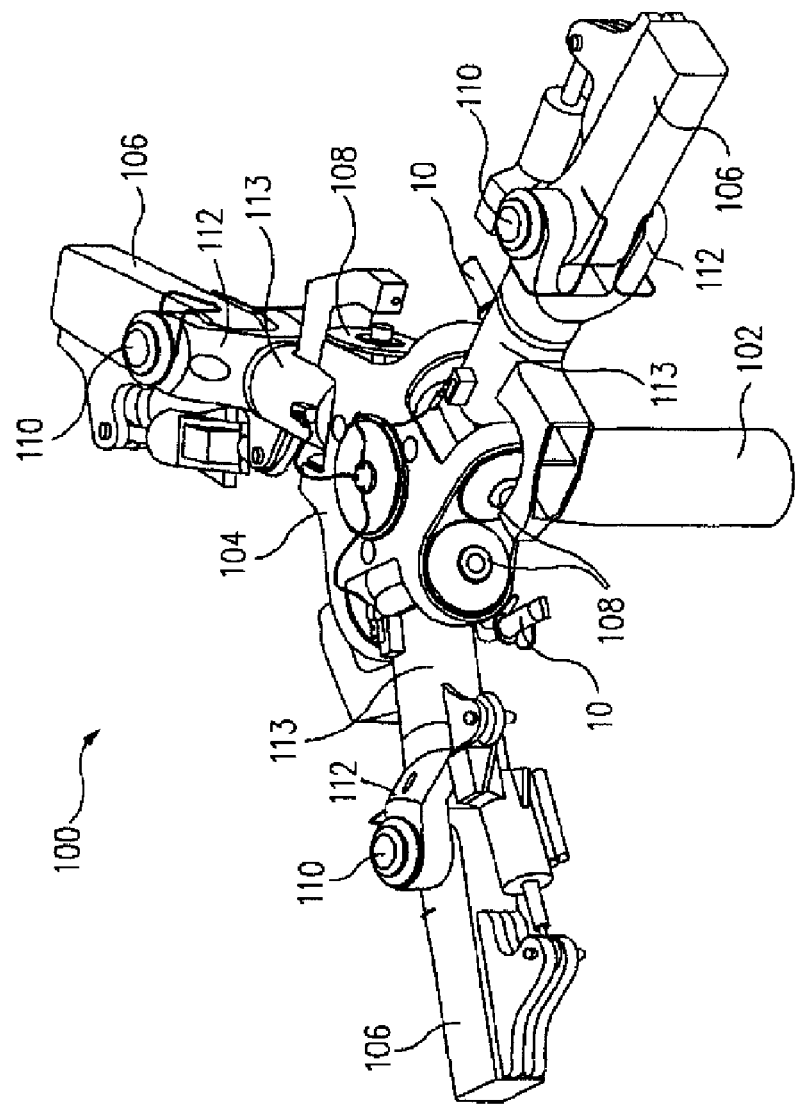

The novel rotor head or hub disclosed herein includes some elements that are similar to those used in the V-22 tilt-rotor, but is otherwise mechanically quite different from the latter. The hub disclosed herein uses a low maintenance, all-elastomer-and-metal laminate (i.e., completely oil-less) bearing system. The exemplary rotor head also provides a high speed, low drag design for a helicopter hub having three or more rotor blades, while enabling a more compact intermeshing blade tandem rotorcraft configuration by eliminating the lead-lag blade motions and dampers associated with conventional fully articulated rotor heads 100, such as that illustrated in FIG. 9.

One of the major problems of the prior art rotor heads that is overcome by the rotor head of the present disclosure is the provision of a low maintenance hub design that uses all lubrication-free elastomeric-metal laminated bearings of a type referred to as "high capacity laminate" (HCL) bearings, available from, e.g., Lord Aerospace Corp., Cary, N.C., and described in, e.g., U.S. Pat. Nos. 4,105,266 to R. Finney and 4,913,411 to F. Collins et al. These types of bearings not only provide superior vibration control, but also require no lubrication, thereby substantially lowering operating and maintenance costs, and are available in a variety of configurations, including cylindrical, conical, spherical and disc-shaped sections, and various combinations of the foregoing.

Another problem solved by the novel stiff in-plane rotor head disclosed herein is that it enables a greater number of rotor blades to be used on the hub than does the prior art, viz., greater than three blades per rotor head. In the particular exemplary embodiment illustrated in the figures, the hub herein incorporates six blades (#1-#6), but can incorporate either more or less blades, as may be indicated by the particular design constraints at hand.

The novel rotor head also enables a more compact intermeshing tandem rotor configuration to be achieved than the fully articulated rotor heads of the prior art, which require substantial clearance between the two rotors due to in-plane leading and lagging motions and out-of-plane "flapping" of the blades. This combination of features of this disclosure results in a rotor head that virtually eliminates large hub moments generated by thrust offset in high speed flight of a type that occurs if a rigid (e.g., a "propeller" type) hub is used. They also result in rotor head assemblies that are relatively light in weight, due to the low hub moments that are generated only by the respective spring rates of the hub bearings themselves. The constant velocity gimbal system provided by the rotor head is thus well suited for high power and high torque applications. It includes a "paddle bearing" arrangement that results in a much larger bearing area than can be achieved with the rod ends of a three-drive link installation, such as that used in the prior art.

When compared to a prior art "teeter" rotor head (not illustrated), the primary advantage provided the hub of the present disclosure is that it can handle a significantly larger number of rotor blades. A teeter hub pivots like a teeter-totter, and as a consequence, can incorporate only 2 rotor blades, which makes such a hub arrangement completely unsuitable for high speed, heavy lift rotorcraft. By contrast, the exemplary rotor hub described herein can incorporate six or more rotor blades.

The main differences between the rotor head 10 of the present disclosure and those of the prior art are as follows:

1) High capacity, pivoting paddle bearings are used to transmit torque across the gimbal joint instead of drive links;

2) Vertical Pitch Arms internal to the hub are used to minimize the "Δ3" pitch-flap coupling effect that occurs when more than three blades are used;

3) A hub assembly of 6 or more blades is made possible; and,

4) The instant rotor head is configured with stationary hub spindle housings for each blade, situated external to the blade's movable pitch control shaft.

The rotor head of the present disclosure is thus superior to the existing solutions because it can be designed to handle the very high torque demands of a large, high speed, heavy lift helicopter. It can be configured for "high solidity" rotors using a large number of rotor blades, e.g., six or more. It also incorporates a low drag hub fairing that enhances high speed performance.

Figure 1:
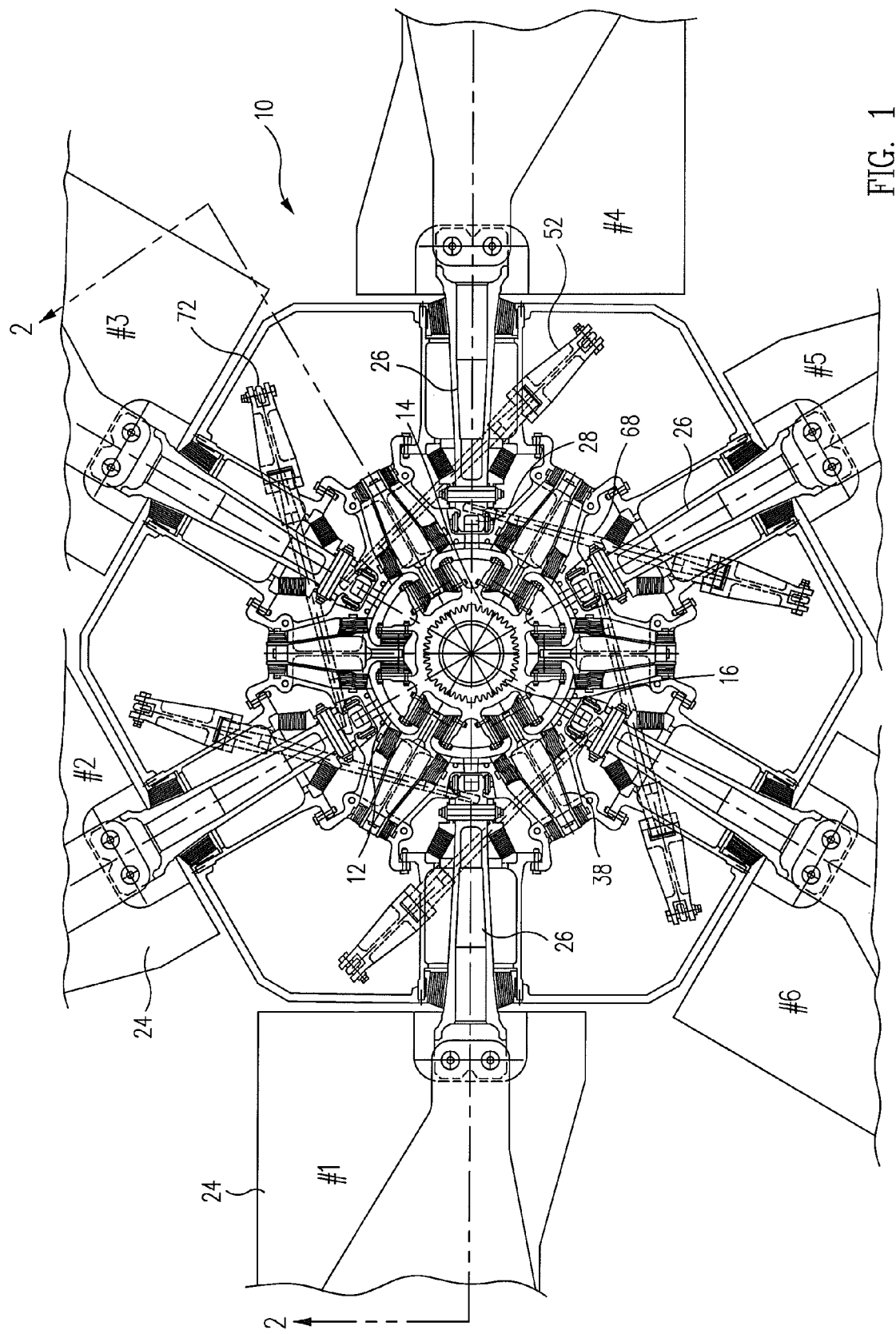
FIG. 1 is a partial cross-sectional plan view of an exemplary embodiment of a stiff in-plane, gimbaled rotor head in accordance with the present disclosure.
Figure 2:
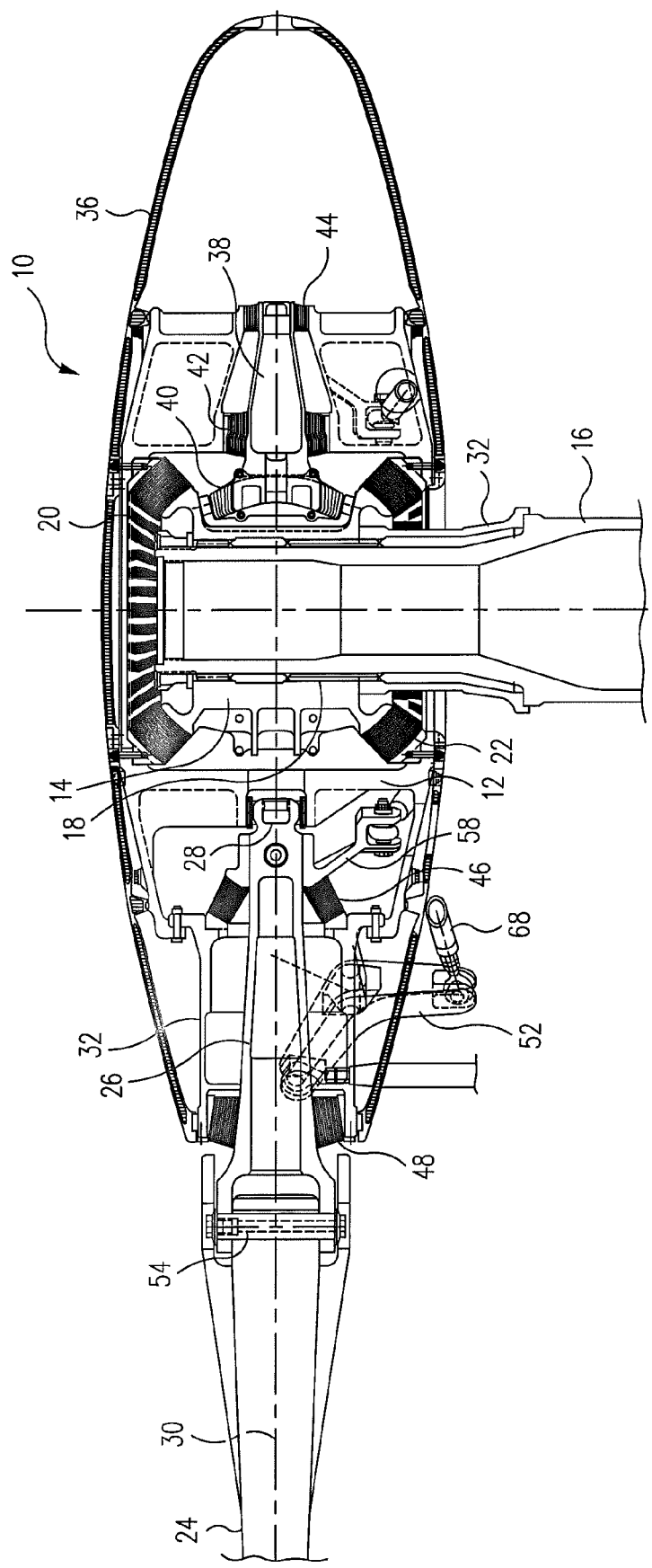
FIG. 2 is a partial cross-sectional elevation view of the exemplary rotor head of FIG. 1, as seen along the lines of the section 2-2 taken therein.

FIG. 1 is a partial cross-sectional top plan view of an exemplary embodiment of a stiff in-plane, gimbaled rotor head 10 in accordance with the present disclosure, and FIG. 2 is a partial cross-sectional elevation view of the exemplary rotor head 10 of FIG. 1, as seen along the lines of the section 2-2 taken therein.

The exemplary rotor head 10 illustrated in FIGS. 1 and 2 comprises a split outer hub 12, a splined center hub 14 and a main rotor shaft 16 having splines 18 at an upper end that are drivingly engaged with the corresponding splines of the center hub 14 in the manner of a spline gear. The center hub 14, in turn, is coupled to the outer hub 12 through upper and lower spherical, high capacity laminated metal-and-elastomeric (HCL) bearings 20 and 22 described in more detail below. A plurality of blades 24, each having an airfoil cross-section, are rigidly coupled to an outboard end of a respective pitch control shaft 26, each of which, in turn, has an inboard end pivotally coupled to the outer hub 12 through a respective dry-lube ball-and-socket joint 28 to enable the respective pitch control shafts and blades associated therewith to rotate about the long axis 30, i.e., the "pitch" axes, of the respective shafts and blades. An outboard end portion of each pitch control shaft 26 is concentrically supported in a pitch bearing housing 32 having an inboard end coupled to the inboard end of a corresponding one of the pitch control shafts 26 through a spherical bearing 46. The hub 10 also incorporates a novel constant velocity joint, described in more detail below, that enables the hub to gimbal about ±12 degrees in any direction relative to a vertical axis extending through the main rotor shaft 16 while maintaining a constant rotational velocity in each of the blades 24.

Figure 3:
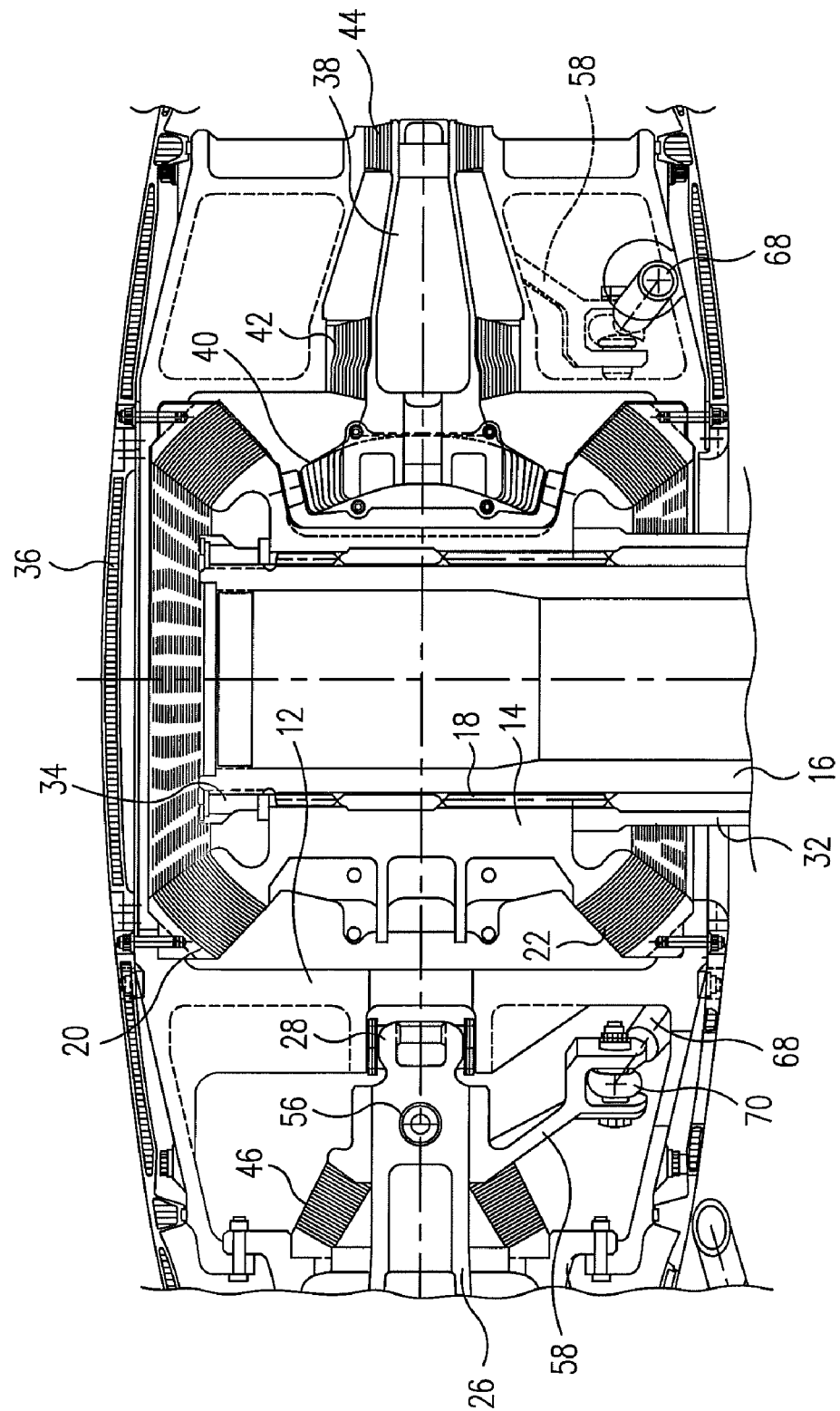
FIG. 3 is an enlarged partial cross-sectional elevation view of a central hub portion of the exemplary rotor head.

FIG. 3 is an enlarged partial cross-sectional elevation view of the center hub 12 portion of the exemplary rotor head 10. As illustrated in FIG. 3, the splined center hub 14 sits atop a splined drive collar 32, which may be made of steel or titanium, located at the bottom center of the hub assembly, and which, together with the center hub, is driven rotationally by the rotor shaft 16. The drive collar 32 is used as a hub spacer and to drive a pitch control swashplate (not illustrated) disposed below the hub. A hub nut and washer 34 are used to retain the hub assembly to the rotor shaft 16.

The splined center hub 14 may also be made of steel or titanium, and is used to transmit torque from the rotor shaft 16 through the paddle bearings 40, 42, 44 and the paddle shaft 38 to the split outer hub 12. The center hub contains features adapted to provide limit stops for the hub's gimbal joint, described below. The upper and lower spherical elastomeric set of bearings 20 and 22 are integral to the center hub and are used to support rotor thrust. This set of bearings has the capability of pivoting about a spherical center point that helps to create the constant velocity joint of the hub. The spherical elastomeric bearing set 20 and 22 comprises a main contributor to the hub's gimbal spring stiffness.

As illustrated in FIG. 3, the split outer hub 12, referred to as such because it comprises upper and lower halves that mate with each other across a horizontal plane in the manner of a clam shell, may be made of, e.g., aluminum or titanium, and surrounds the center hub 14. It performs the following functions, among others: 1) It retains the gimbaled hub's paddle bearing assemblies described below, which are used for torque drive; 2) it connects the gimbaling split outer hub to the non-gimbaling inner hub through the upper and lower spherical bearing set 20 and 22; 3) it is used to connect to each rotor blade's pitch bearing housing 32 and pitch shaft 26 spindle; 4) it supports the centrifugal forces of each blade 24 through a corresponding pitch bearing housing 32; and, 5) it is used to attach a streamlined composite hub-fairing 36 to the rotor head 10.

As illustrated in FIGS. 1-3, a plurality of paddle bearing shafts 38 are respectively located about the circumference of the outer hub 12 and between each pair of adjacent rotor blade 24 installations thereon. Each paddle bearing shaft 38 is a subassembly comprising a titanium or steel center shaft integrated with three elastomeric bearing installations, described below in connection with FIGS. 7 and 8. The center shaft and elastomeric bearings comprise an important innovation of the gimbal mechanism of the rotor head 10 described below. As illustrated in FIG. 3, the inboard end of each center-shaft includes a paddle bearing 40 that, acting in combination with the center hub 14, provide limit stops of about ±12° for the gimbal joint of the rotor head 10. Following is a description of the three elastomeric bearing assemblies disposed on the paddle bearing shaft 38.

As those of skill in the art will appreciate, in order to provide stiff in-plane movement of the rotating blades 24, i.e., to eliminate in-plane pivoting of the rotating blades during gimbaling movement of the hub 10, it is necessary to maintain a substantially constant angular velocity, or rotational speed, of each radial point in each of the blades during such motion. In order to achieve this, it is necessary to provide a constant velocity joint between the blades 24 and the rotor shaft 16 that applies the torque used to drive the blades.

Figure 7:
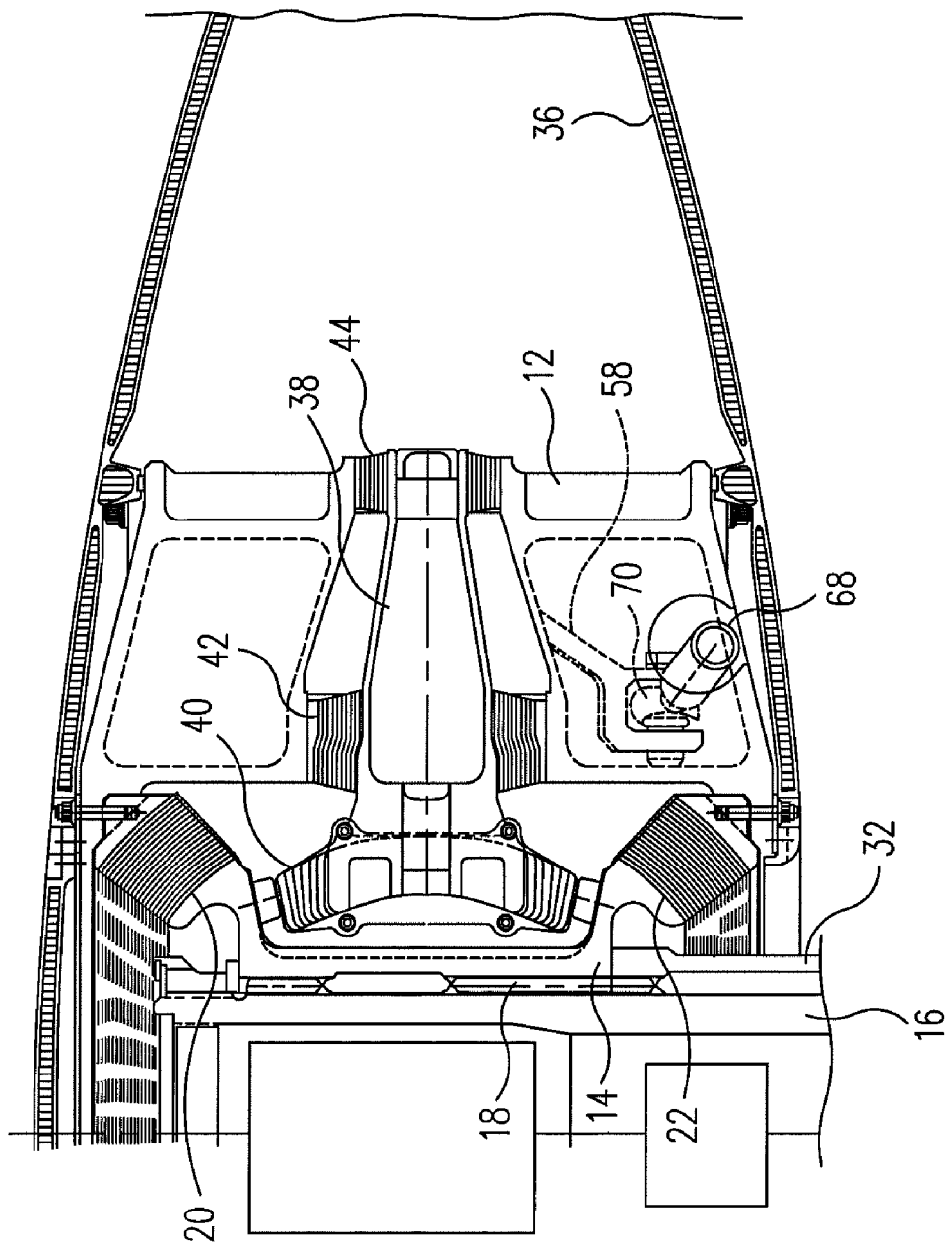
FIG. 7 is an enlarged partial cross-sectional elevation view of a constant velocity joint of the rotor head, showing details of the bearings thereof.
Figure 8:
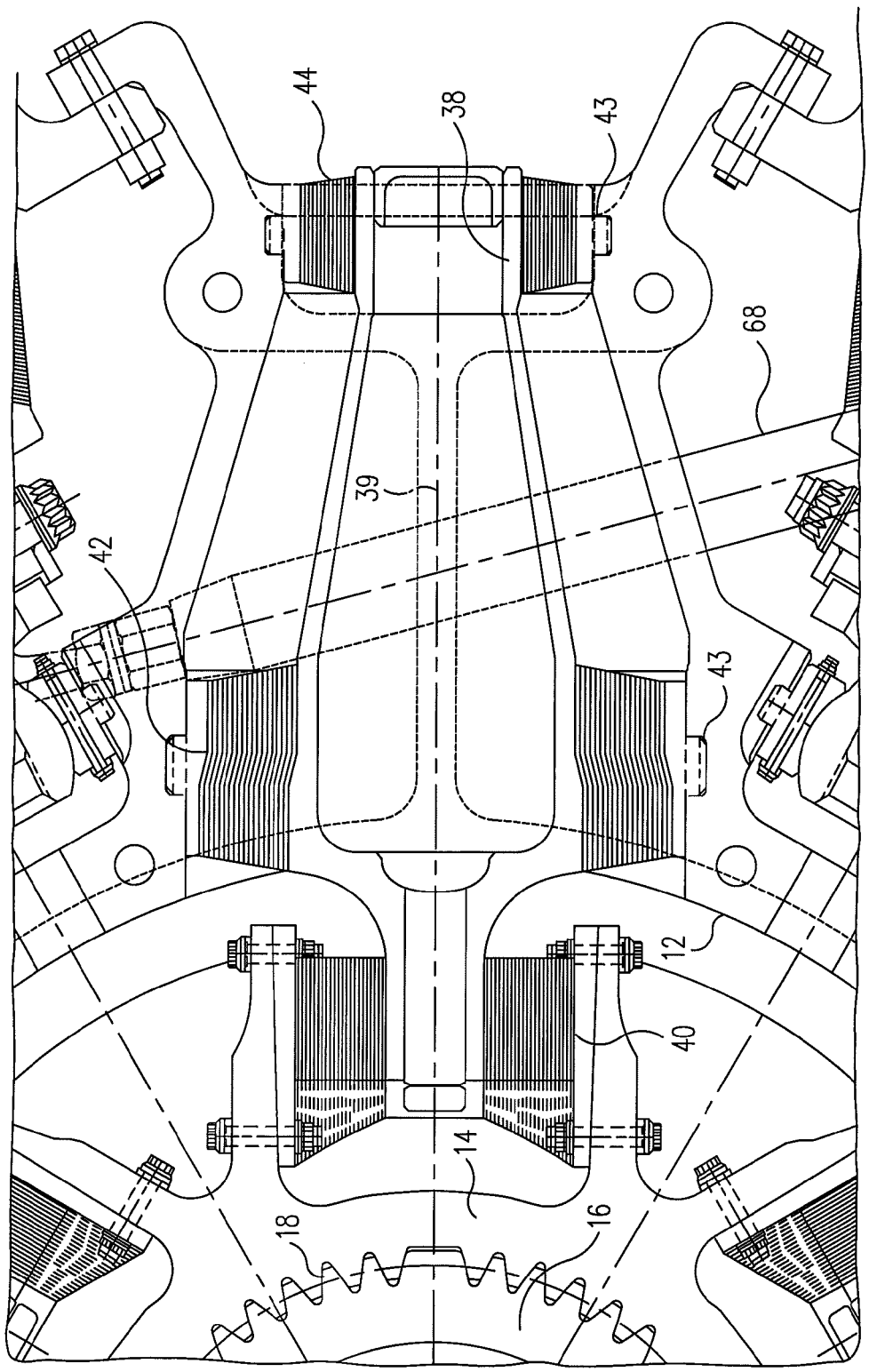
FIG. 8 is an enlarged partial cross-sectional plan view of the constant velocity joint of FIG. 7; and, FIG. 9 is a partial perspective view of an exemplary embodiment of a fully articulated type of rotor head in accordance with the prior art.

FIG. 7 is an enlarged partial cross-sectional elevation view of the constant velocity joint of the rotor head 10, showing details of the bearings thereof, and FIG. 8 is an enlarged partial cross-sectional top plan view of the constant velocity joint of FIG. 7. As illustrated in these figures, a tapered stack, flat pack, elastomeric paddle bearing 40 shaped like a hollow disc sector is located at the inboard end of each paddle shaft 38. The disc-sector or paddle bearing 40 is used to transmit rotor shaft 16 torque from the non-gimbaled inner or center hub 14 to the gimbaled split outer hub 12. Its disc shape follows the gimbaling motion of the set of upper and lower spherical bearings 20 and 22 described above that is part of the inner hub 14. The combination of all of the paddle bearings 40 and the center hub's spherical bearing set 20 and 22 serves as the main contributor to the ability of the rotor head 10 to engage in gimbaling movement in any direction relative to a vertical axis through the main rotor 16 and to the spring stiffness of the gimbal joint defined thereby.

Referring to FIGS. 7 and 8, each paddle bearing shaft 38 is disposed above a web 39 (shown in dashed outline in FIG. 8) of the split outer hub 12, and a main radial support bearing 42 is located on each paddle shaft 38 outboard of the paddle bearing 40. The main radial support bearing serves as one of the pivot bearings for the paddle bearing shaft 38. The paddle bearing shaft transmits rotor torque loads into the main radial support bearing 42. This radial bearing also incorporates a small conical section that provides the ability to carry the centrifugal loads of the paddle bearing shaft 38. The combination of all of the main radial support bearings 42 adds to the total spring rate of the gimbal joint.

As also illustrated in FIGS. 7 and 8, a radial tail support bearing 44 is located at the outboard end of the paddle bearing shaft 38. This second radial bearing serves as a second pivot bearing for the paddle bearing shaft 38. Acting in cooperation with the main radial support bearing 42, it reacts paddle shaft 38 moments generated by rotor torque. The combination of all the radial tail support bearings 44 further adds to the total spring rate of the gimbal joint. As illustrated in the top plan view FIG. 8, each of the main radial support and radial tail support bearings 42 and 44 may be coupled to the respective paddle bearing shaft 38 through respective anti-rotation tabs 43.

Figure 4:
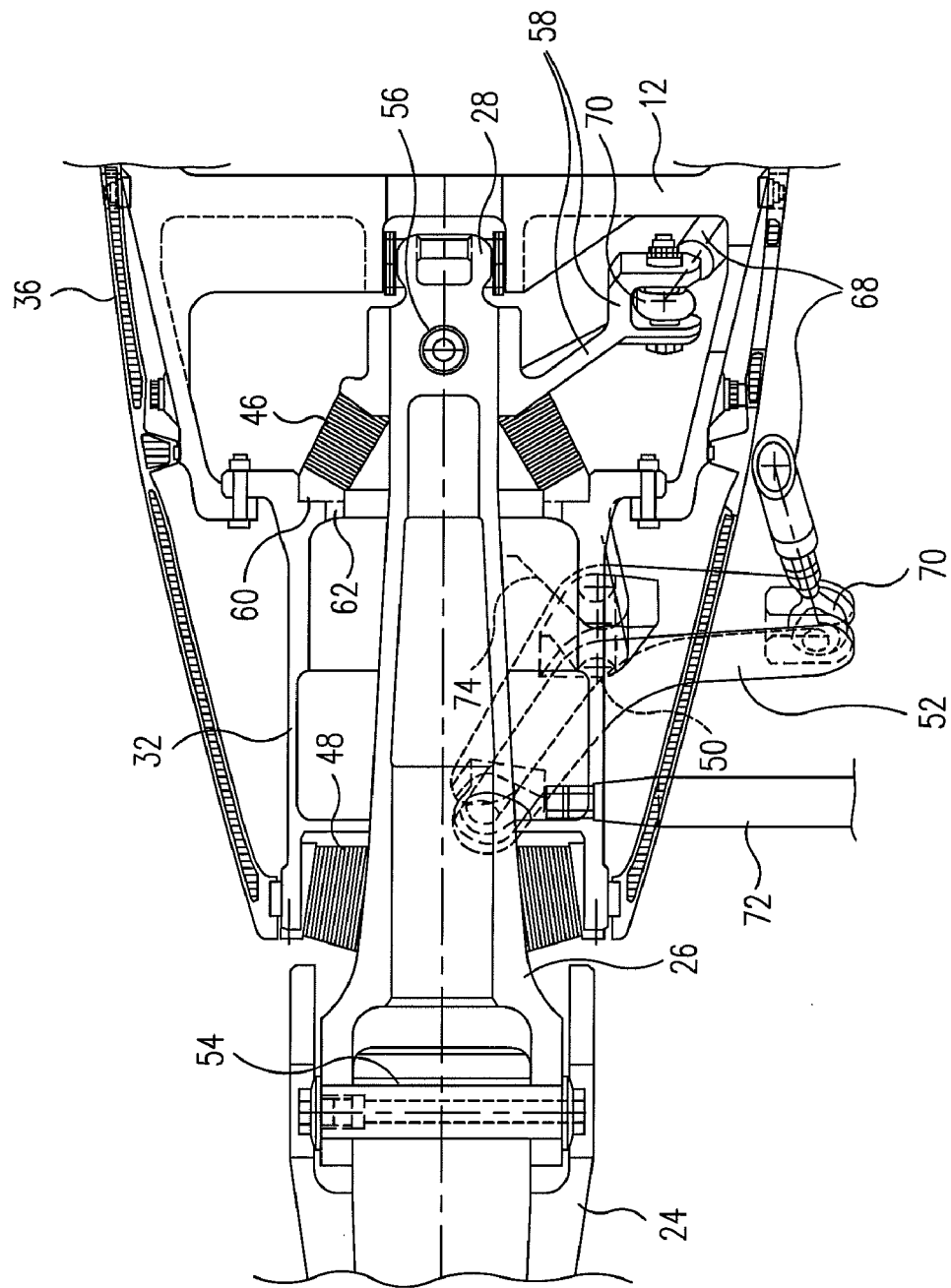
FIG. 4 is an enlarged partial cross-sectional elevation view of a blade retention and pitch control portion of the rotor head.

Turning to FIG. 4, which is an enlarged partial cross-sectional elevation view of a rotor blade 24 retention and pitch control portion of the rotor head 10, the pitch bearing housing 32, which may be made of aluminum or titanium, is connected to the split outer hub 12 and to an inboard end of a corresponding one of the pitch control shafts 26 through a corresponding spherical elastomeric bearing 46, and is used to retain spherical and conical elastomeric bearings 46 and 48 utilized for retention and pitch control of the rotor blades 24. As illustrated in FIG. 4, the pitch bearing housing 32 also incorporates a support lug 74 on its outer diameter to mount a pitch control bell-crank 52 of another blade, as described in more detail below.

The outboard end of each pitch control shaft 26 incorporates a concentric integral conical elastomeric bearing 48 required for rotor blade pitch control. The conical bearing is used to bear the very high shear loads transmitted into it from the rotor blade assembly. The taper angle of the conical bearing is arranged to provide a preload capability, together with the spherical blade retention bearing 46 located at the opposite end of the pitch control shaft 26. The bearing's taper angle also allows for a large outboard cross section on the pitch control shaft 26 where blade-induced moments are highest.

A two-pin clevis joint 54, which is used to rigidly attach the inboard end of each rotor blade 24 to the outboard end of the corresponding pitch control shaft 26, is disposed adjacent to the conical bearing 48 at the very outboard end of the pitch control shaft 26. The inboard end of the pitch control shaft 26 is connected with a main retention pin 56 to the spherical elastomeric bearing 46 used for blade 24 pitch control and retention. Disposed adjacent to the spherical elastomeric bearing 46 at the inboard end of the shaft 26 is a spherical ball 28 that is machined, or otherwise formed, on the inboard end of the shaft, and which is used as an inboard support within the hub. The ball 28 picks up the pitch control shaft's inboard shear loads and prevents that load from being transmitted into the spherical elastomeric bearing 46. The ball 28, which may be made of steel, also serves as a positive center pivot for the spherical elastomeric bearing 46. The outer race of the ball is preferably lined with a dry-film bearing material and is mounted into a corresponding socket formed in the split outer hub 12. The combination of the outboard conical bearing 48 and the inboard spherical bearing 46 provides a mechanism to preload the bearing elastomers so as to improve bearing service life.

As illustrated in FIG. 4, the spherical blade retention bearing 46 is located at the inboard end of the pitch control shaft 26, and is pinned to the pitch control shaft with the main retention pin 56. The blade retention bearing 46 is also an elastomeric laminate bearing assembly that is used to transmit the very high centrifugal loading of the rotor blade 24 into the inboard end of the corresponding pitch bearing housing 32, and thence, into the split outer hub 12. The inboard end plate of the blade retention bearing 46 includes a pitch arm 58 that is used for controlling the pitch of the associated rotor blade 24. The outboard end of the blade retention bearing rests on a shoulder 60 in the associated pitch bearing housing and is keyed into the shoulder with shear tabs 62 disposed on the endplate of the bearing.

Figure 6:
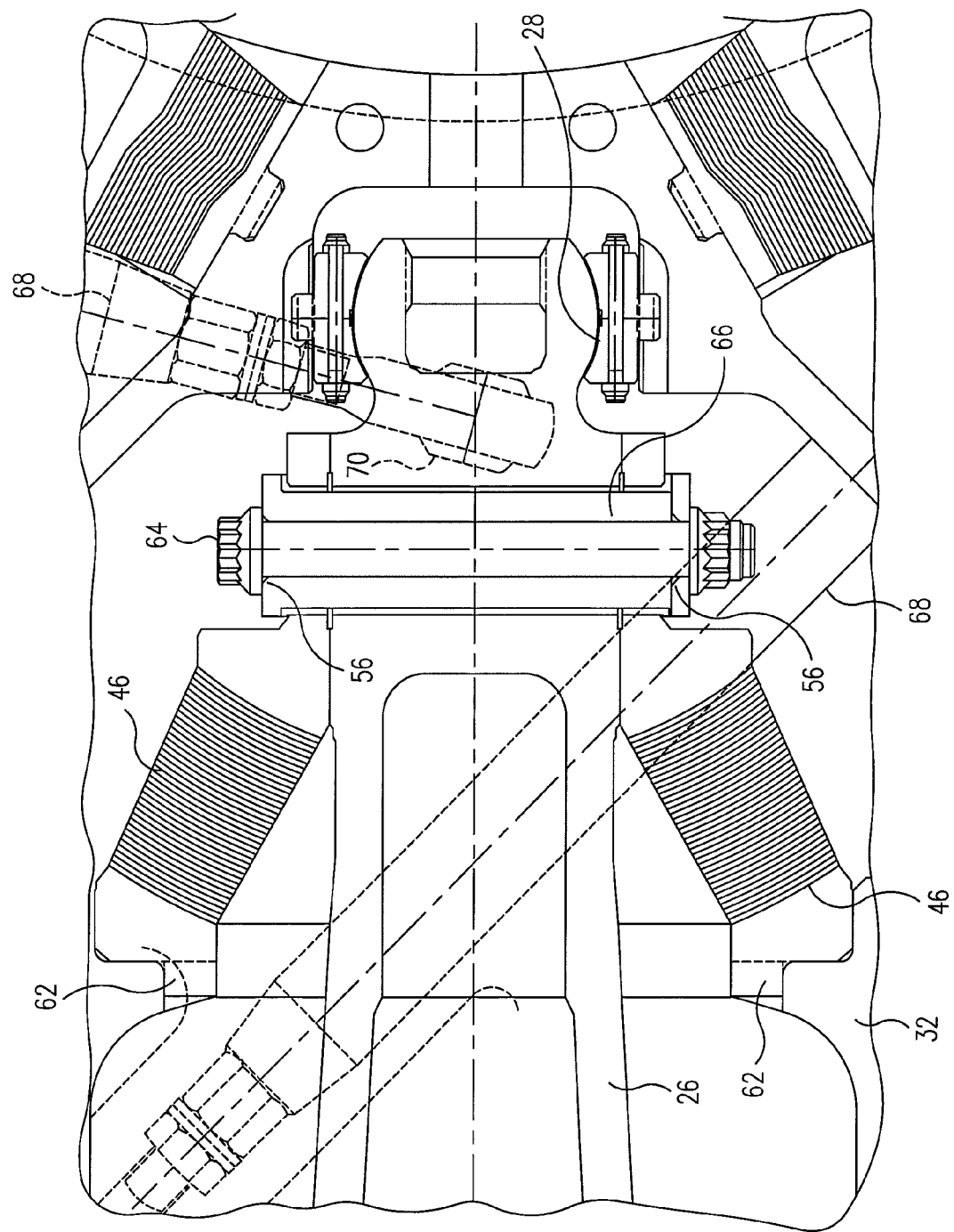
FIG. 6 is an enlarged partial cross-sectional elevation view of the blade retention mechanism of the rotor head of FIG. 4, showing details of a retention pin and a dry-lube ball-and-socket joint thereof.

FIG. 6 is an enlarged partial cross-sectional elevation view of the blade retention mechanism of the exemplary rotor head 10 illustrated in FIG. 4, and shows details of the main retention pin 56 and the dry-lube ball-and-socket joint 28 thereof. The main retention pin 56, which may be made of steel, is similar to a tie-bar pin of a type used on a conventional hub, such as that used on the prior art rotor of FIG. 9. The annular main retention pin 56 is used to couple the spherical blade retention bearing 46 to the pitch control shaft 26. It also functions to transmit retention loads and pitch control loads from the associated blade 24 into the spherical blade retention bearing 46 and pitch arm 58. Due to its critical function within the rotor head 10 assembly, it is configured with a fail-safe capability described below.

The annular main retention pin 56 is held into the assembly with a high tensile bolt 64 extending through its center. A small amount of clearance is provided between the inside diameter of the retention pin and the bolt 64 so as to define a sealed annular chamber 66 into which a crack detection dye may be injected. In the event of a crack in the main retention pin 56, the high tensile retention bolt 64 has the capability of carrying the full centrifugal and pitch loads. Any leakage of dye from the chamber 66 serves to alert ground personnel that the main retention pin 56 has been compromised. If desired, an optional short spline (not illustrated) can be added to the pitch control shaft 26 and spherical retention bearing 46 joint as a secondary load path for coupling pitch control loads.

Figure 5:
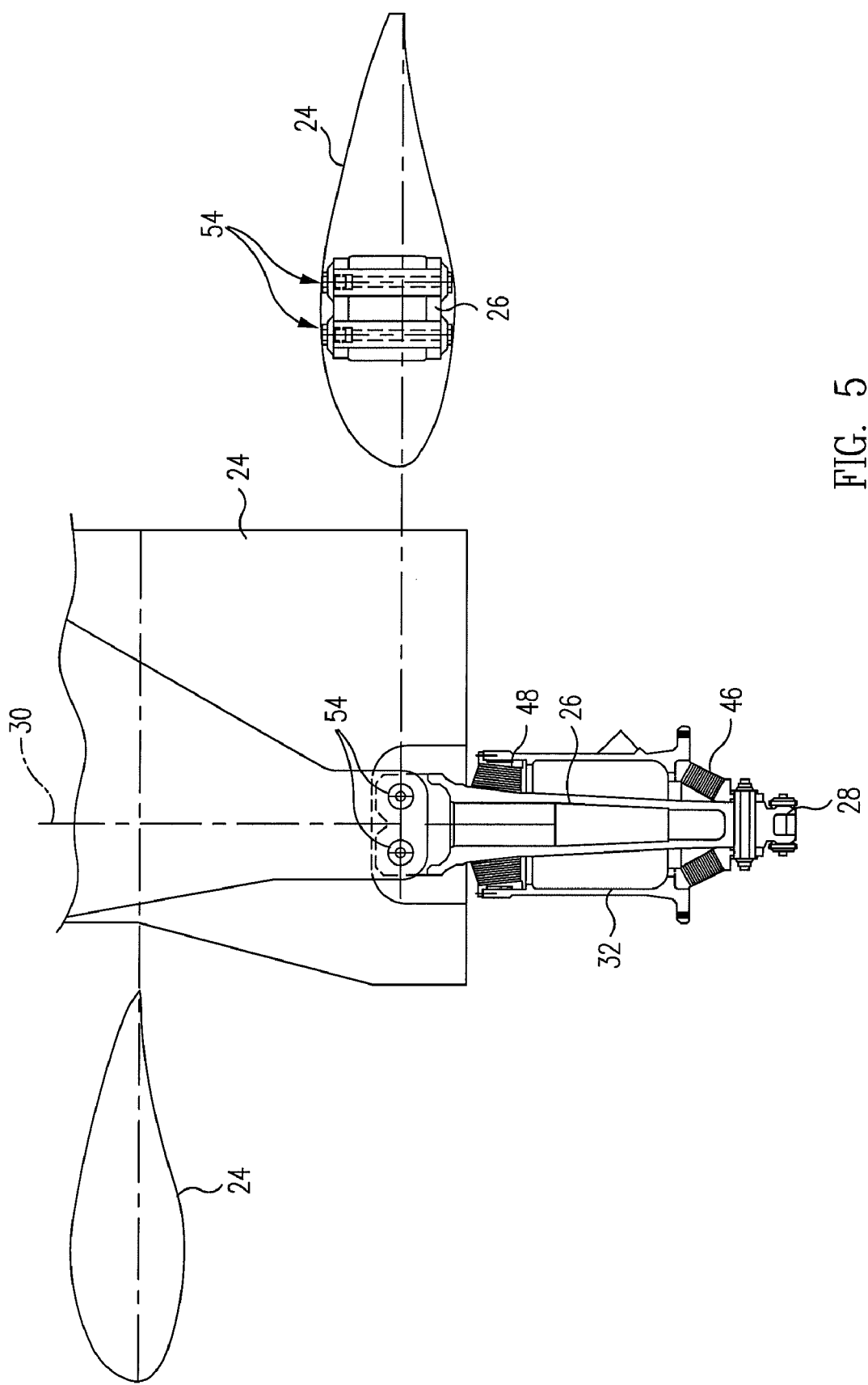
FIG. 5 is partial cross-sectional plan view of a blade and associated pitch control shaft of the rotor head, showing two cross-sectional detail views through the blade at two stations along a pitch axis thereof.

FIG. 5 is partial cross-sectional top plan view of a blade 24 and associated pitch control shaft 26 of the rotor head 10, showing two cross-sectional detail views through the blade at two stations along the pitch, or long axis 30 thereof. As discussed above, each blade 24 is rigidly fixed to the outboard end of a corresponding one of the pitch control shafts 26 with a two-pin clevis joint 54. The clevis pins and bolts 54, which may be made of steel, are located at the interface of the rotor blade 24 and the outboard end of the pitch control shaft 26. Two pins are used to attach the rotor blade 24 to the pitch control shaft rigidly so as to prevent any leading/lagging movements of the blade in the plane of rotation relative to the shaft, in contradistinction to the in-plane movement of the blades in the flexible in-plane rotor hub 100 discussed above.

One of the principal innovations of the exemplary gimbaled rotor head 10 disclosed herein and illustrated in FIGS. 1-4 and 6-8 is the pitch control cross links 68 used to control the pitch of the respective blades 24. The pitch control cross links, each of which may be made of titanium, comprise a control rod assembly with spherical rod end beatings 70 located at each end thereof. By utilizing a vertical pitch arm 58 (see FIG. 4) located internal to the rotor head 10, the pitch control cross links respectively connect to the pitch arms 58 and pass horizontally below an adjacent blade installation and over to a respective associated pitch control bell-crank 52. The pitch control bell-cranks are then located in the hub assembly at a strategic point that (to an acceptable level) minimizes the pitch—flap coupling, i.e., the "Δ3 angle," of the vertical pitch link 72 in the rotor's upper controls, which are located below the gimbaled rotor head assembly 10.

As illustrated in FIG. 4, the pitch control bell-cranks 52 (shown by dotted outline), which may be made of aluminum or titanium, are approximately 80° bell-cranks that respectively convert vertical motion from the respective vertical pitch links 72 to nearly horizontal movement of the respective pitch control cross links 68. In a six-bladed rotor assembly, such as the exemplary embodiment illustrated in the figures, the bell-cranks may be mounted into a machined clevis 74 that is a part of the pitch bearing housing 32 of an adjacent blade installation.

As illustrated in the figures, the streamlined hub fairing assembly 36 incorporates a split fiberglass or carbon fiber honeycomb composite construction. It is a light weight assembly that comprises upper and lower clam shell portions, as well as a removable access cover for the main rotor hub nut 34. The fairing incorporates a streamlined shape that covers the rotor hub 10 assembly and its appendages that extend out to the roots of the airfoil rotor blades 24. The fairing enhances the performance of the host rotorcraft in high speed flight by reducing hub drag, which is a major contributor to the overall drag of such aircraft.

The novel rotor hub 10 disclosed herein provides an advance in the 'state of the art' in rotor head design that enables helicopters to operate at higher speeds, higher gross weights, and higher power levels than conventional rotorcraft, such as the CH-47 or CH-53 rotorcraft, can operate.

The stiff in-plane feature of the rotor head 10 is particularly suited for tandem helicopters with overlapping rotors. Because there is no lead-lag hinge, it eliminates the lag damper, adds simplicity, allows for the installation of up to six or more rotor blades for higher speeds and gross weights, and provides good rotor-to-rotor clearance, even when the respective rotor centers are placed relatively close to each other. For both single and tandem rotor designs, the stiff in-plane gimbaling hub 10 in high speed flight reduces large pitch link loads generated by the large lead-lag excursions of advancing and retreating blades of the prior art.

The novel gimbal joint of the hub 10 is also well suited for both single rotor and tandem rotor aircraft. When compared to a rigid rotor, it relieves large hub moments in high speed flight generated by the lateral thrust differential of advancing and retreating rotor blades. This overall reduction in moment and force in the rotor head thereby substantially simplifies rotor head parts and reduces part weight.

One of the reasons that the rotor head 10 herein is well suited for high power and high torque applications is the novel gimbal system provided thereby. The paddle shaft and bearing arrangement of the hub thus results in a much larger bearing area then can be achieved with the rod ends of a three-drive-link installation, such as used on prior art rotor heads. In a six-bladed installation, the rotor head 10 can incorporate up to six paddle bearing assemblies, thereby providing a very high torque capability.

The horizontal pitch control cross links 68 also provide an advantage over the prior art. By virtue of their passing below adjacent blade installations, the horizontal pitch control link 68 enable the use of an acceptable pitch-flap Δ3 angle at the vertical pitch links 72, even when six or more blades are used.

The rotor head 10 also makes wide use of elastomeric rotor bearing technology that results in fewer parts and lower production, maintenance and life cycle costs, in that at least one of the spherical main gimbal bearing, the pitch bearing housing conical bearing, the spherical blade retention bearing, the paddle bearing, the radial tail support bearing and the main radial support bearing comprises a lubrication-free elastomeric-metal laminated bearing. Indeed, most of the parts of the rotor heads of the forward and aft rotors of a tandem rotor installation can be identical, thereby providing further production cost effectiveness.

In accordance with the exemplary embodiments described herein, high speed, low drag, low maintenance, stiff in-plane, gimbaled rotor heads are provided for helicopters that enable three or more rotor blades to be used per rotor, and that also enable a compact tandem rotor blade intermesh to be achieved by eliminating the lead-lag motions and dampers of fully articulated rotor heads.

As those of skill in this art will appreciate, many modifications, substitutions and variations can be made in the applications and methods of implementation of the stiff in-plane, gimbaled rotor heads of the present disclosure without departing from its spirit and scope. In light of this, the scope of the present disclosure should not be limited to that of the particular embodiments illustrated and described herein, as they are only by way of some examples thereof, but instead, should be fully commensurate with that of the claims appended hereafter and their functional equivalents.

What is claimed is:

1. A stiff in-plane gimbaled rotor head for a rotorcraft, comprising:
    an elongated, vertically extending rotor shaft having an axis of rotation;
    a center hub disposed at an upper end of and rotationally driven by the rotor shaft;
    an outer hub surrounding and coupled to the center hub through a spherical main gimbal bearing for conjoint rotation with the center hub and such that the outer hub is also capable of an angular range of gimbaling movement relative to the center hub;
    an elongated, radially extending blade having an airfoil cross-section and an inboard end coupled to the outer hub;
    a constant velocity joint coupling driving torque from the rotor shaft to the blade through the center and outer hubs such that, during rotation of the blade about the axis of rotation of the rotor shaft, the rotational velocity of the blade about the axis of rotation remains substantially constant during gimbaling movements of the outer hub relative to the inner hub and
    a blade pitch control mechanism, including:
    a pitch arm having an inboard end rigidly coupled to the inboard end of a pitch control shaft of the blade and an opposite outboard end;
    a horizontally extending pitch control cross link having a first end pivotably coupled to the outboard end of the pitch arm and an opposite second end pivotably coupled to a first arm of a pivotally mounted bell-crank; and,
    a vertically extending pitch link having an upper end connected to a second arm of the bell-crank.

2. The rotor head of claim 1, wherein the constant velocity joint comprises:
    an elongated, radially extending pitch control shaft having opposite inboard and outboard ends, the inboard end being pivotally coupled to the outer hub, the outboard end being rigidly coupled to the inboard end of the blade;
    an annular, radially extending pitch bearing housing disposed concentrically about the pitch control shaft and having opposite inboard and outboard ends, the outboard end having a conical bearing disposed concentrically in the outboard end and supporting an outboard end portion of the pitch control shaft; and,
    a spherical blade retention bearing coupling the inboard end of the pitch bearing housing to the inboard end of the pitch control shaft.

3. The rotor head of claim 2, wherein the constant velocity joint further comprises an elongated, radially extending paddle shaft disposed adjacent to the blade and extending through a radial opening through the outer hub, the paddle shaft having an inboard end coupled to the center hub through a hollow, disc sector shaped paddle bearing, an outboard end coupled to the outer hub through a concentric radial tail support bearing and a middle portion coupled to the outer hub through a concentric main radial support bearing.

4. The rotor head of claim 1, wherein the outer hub is split into upper and lower halves coupled to each other across a horizontal plane.

5. The rotor head of claim 2, wherein the inboard end of the pitch control shaft is coupled to the outer hub through a ball-and-socket joint, and wherein an outer race of the ball of the joint is lined with a dry-film bearing material.

6. The rotor head of claim 3, wherein at least one of the spherical main gimbal bearing, the pitch bearing housing conical bearing, the spherical blade retention bearing, the paddle bearing, the radial tail support bearing and the main radial support bearing comprises a lubrication-free elastomeric-metal laminated bearing.

7. The rotor head of claim 3, wherein the radial tail support bearing and the main radial support bearing are coupled to the outer hub through anti-rotation tabs.

8. The rotor head of claim 2, wherein the spherical blade retention bearing is coupled to the pitch control shaft by an annular main retention pin having a bolt extending through its center, the retention pin and bolt defining a sealed annular chamber for containing a liquid crack detection dye.

9. The rotor head of claim 1, further comprising a streamlined fairing surrounding the center and outer hubs.

10. The rotor head of claim 1, wherein the outer hub is capable of an angular range of gimbaling movement of about ±12 degrees relative to the center hub.

11. A rotorcraft incorporating the rotor head of claim 1.

12. A method for rotating each of a plurality of rotorcraft blades in a common plane and about an axis of rotation while controlling the respective pitches of the blades and substantially preventing any other relative in-plane and out-of-plane movements of the blades during the rotating, the method comprising:
    providing a rotating rotor shaft concentric to the axis of rotation;
    fixing a central hub to the rotor shaft for conjoint rotation therewith;
    coupling an outer hub to the center hub for conjoint rotation therewith and such that the outer hub is capable of an angular range of gimbaling movement relative to the center hub; and, coupling an inboard end of the blades to the outer hub such that each blade is capable of pitching movement relative to the outer hub during rotation and is substantially incapable of any other movements relative thereto during rotation, wherein the coupling of the inboard end of the blades to the outer hub comprises:

pivotably coupling respective inboard ends of a plurality elongated, radially extending pitch control shafts to the outer hub;

rigidly coupling the inboard end of each blade to an outboard end of a corresponding pitch control shaft;

disposing an annular, radially extending pitch bearing housing concentrically about each pitch control shaft, each pitch bearing housing having an outboard end with a conical bearing disposed concentrically in the outboard end;

supporting an outboard end portion of each pitch control shaft concentrically within the conical bearing of a corresponding one of the pitch bearing housings;

coupling the inboard end of each pitch control shaft to an inboard end of the corresponding pitch bearing housing with a spherical blade retention bearing;

disposing an elongated, radially extending paddle shaft between each pair of adjacent blades and through a corresponding radial opening extending the outer hub;

coupling an inboard end of each addle shaft to the center hub through a hollow, disc sector shaped paddle bearing;

coupling an outboard end of each paddle shaft to the outer hub through a concentric radial tail support bearing contained in the corresponding radial opening of the outer hub; and, coupling a middle portion of each paddle shaft to the outer hub through a concentric main radial support bearing contained in the corresponding radial opening of the outer hub.

13. The method of claim 12, wherein the coupling of the outer hub to the inner hub comprises coupling the outer hub to a spherical bearing integral to the center hub.

14. The method of claim 12, further comprising selectably varying the angle between the common plane of rotation of the blades and the axis of rotation thereof during the rotating by varying the gimbal angle between the outer hub and the center hub.

15. A stiff in-plane gimbaled rotor head for a rotorcraft, comprising:

an elongated, vertically extending rotor shaft having an axis of rotation;

a center hub disposed at an upper end of the rotor shaft for conjoint rotation therewith about the axis of rotation;

an outer hub surrounding the center hub and coupled thereto through a spherical main gimbal bearing for conjoint rotation with the center hub and about the axis of rotation and such that the outer hub is capable of an angular range of gimbaling movement relative to the center hub;

a plurality of elongated, radially extending pitch control shafts, each having an inboard end pivotally coupled to the outer hub and an opposite outboard end;

a plurality of elongated, radially extending rotor blades, each having an airfoil cross-section and an inboard end rigidly coupled to the outboard end of a corresponding one of the pitch control shafts;

a plurality of annular, radially extending pitch bearing housings respectively disposed concentrically about a corresponding one of the pitch control shafts and having opposite inboard and outboard ends, the outboard ends having respective conical bearings disposed concentrically therein and supporting an outboard end portion of the corresponding pitch control shaft;

a spherical blade retention bearing coupling the inboard end of each pitch bearing housing to the inboard end of the corresponding pitch control shaft;

a plurality of elongated, radially extending paddle shafts, each disposed between a pair of adjacent blades and extending through a corresponding radial opening through the outer hub, each having an inboard end coupled to the center hub through a hollow, disc sector shaped paddle bearing, an outboard end coupled to the outer hub through a concentric radial tail support bearing contained in the corresponding radial opening of the outer hub and a middle portion coupled to the outer hub through a concentric main radial support bearing contained in the corresponding radial opening of the outer hub.

16. The rotor head of claim 15, wherein at least one of the spherical main gimbal bearing, the pitch bearing housing conical bearing, the spherical blade retention bearing, the paddle bearing, the radial tail support bearing and the main radial support bearing comprises a lubrication-free elastomeric and metal laminated bearing.

17. A rotorcraft incorporating a pair of the rotor heads of claim 15 disposed in tandem thereon.

18. The rotorcraft of claim 17, wherein each of the rotor heads incorporates three or more of the rotor blades, and wherein the respective blades of each rotor intermesh with the blades of the other rotor during rotation thereof.

* * * * *